United States Patent [19]

Westdale et al.

[11] 4,073,980

[45] Feb. 14, 1978

[54] CHEMICALLY TREATED CARRIER PARTICLES FOR USE IN ELECTROPHOTOGRAPHY

[75] Inventors: Virgil W. Westdale, Chagrin Falls, Ohio; John Novotny, San Jose, Calif.

[73] Assignee: Addressograph Multigraph Corporation, Cleveland, Ohio

[21] Appl. No.: 728,461

[22] Filed: Sept. 29, 1976

[51] Int. Cl.[2] ........................ B32B 15/02; B32B 19/00

[52] U.S. Cl. .................................... 428/404; 428/403; 428/406; 252/62.1 P

[58] Field of Search ............... 428/403, 404, 406, 407; 252/62.1 P

[56] References Cited

U.S. PATENT DOCUMENTS

| | | | |
|---|---|---|---|
| 3,246,148 | 4/1966 | Troeyer et al. | 252/62.1 P |
| 3,377,286 | 4/1968 | Stricklin | 252/62.1 P |
| 3,533,835 | 10/1970 | Hagenbach et al. | 252/62.1 P |
| 3,873,355 | 3/1975 | Queener et al. | 428/407 |
| 3,922,381 | 11/1975 | Datta | 252/62.1 P |

*Primary Examiner*—Roland E. Martin, Jr.
*Attorney, Agent, or Firm*—Michael A. Kondzella

[57] ABSTRACT

Carrier particles for use in an electrophotographic process are prepared by applying a mixture of a perfluoro acid and molybdenum disulfide to the surface of the carrier particle. The resulting carriers have a very thin and effective film deposited on the surface thereof and are long lived and abrasion resistant.

8 Claims, No Drawings

CHEMICALLY TREATED CARRIER PARTICLES FOR USE IN ELECTROPHOTOGRAPHY

BACKGROUND OF THE INVENTION

This invention relates to carriers for use in developer formulations which charge electroscopic powders triboelectrically. These carriers are useful in electrophotographic processes for developing latent electrostatic images in which a colored toner carried by the carrier particle is caused to be attracted from the carrier particle to develop the latent electrostatic image.

In the electrophotographic process it is necessary to use a carrier for the toner in order to produce an electrostatic charge upon the toner particles. Various kinds of developing processes are known including cascade, powder cloud and magnetic brush processes. In each of these processes it is necessary that the carrier used have certain triboelectric properties so that it is capable of imparting to the toner particles an electrostatic charge of the proper polarity and magnitude. Where uncoated carrier particles are used it has been necessary to select a toner having the desired triboelectric properties. Recently, it has been found that the carrier particles can be coated with various types of polymeric coatings to permit variation in the triboelectric properties thereof. One such method is disclosed in U.S. Pat. No. 3,811,880 to Luther C. Browning, assigned to the same assignee as this invention.

Although polymeric coatings of this type enable a certain degree of control of the triboelectric properties of the developer mix, it has been found that in use in the environment of electrophotographic reproduction machines such carrier particles are subject to aging which limits their effectiveness. Wearing away and removal of part of the polymeric coating upon the surface of the carrier particles is another problem encountered. This may result in undesired abrasion of the photoconductive surface used for imaging and also cause bias shorting.

Another problem inherent in the use of polymeric coatings for carrier particles is the phenomenon known as "bound toner." Through a mechanism which is not clearly understood prolonged usage of developer mixes including polymeric coated carrier particles results in toner being adhered onto the surface of the coated carrier causing a decrease in the effectiveness of the toning process and hence in the overall development of the images being reproduced.

More recent developments include use of perfluoro carboxylic acid coated carriers which impart a positive triboelectric charge to electroscopic powders with which they are mixed as described in U.S. Pat. No. 3,922,381 to Pabitra Datta and the use of molybdenum disulfide and similar materials which are effective to improve the fatigue resistance of developer mixes as described in copending application Ser. No. 570,279, filed Apr. 21, 1975, by Virgil W. Westdale and Charles A. Kumins, both assigned to the assignee of this invention. However, the triboelectric properties, abrasion resistance and longevity of such materials leaves something to be desired.

OBJECTS

It is accordingly an object of this invention to provide carriers for toners which are not subject to the disadvantages mentioned above.

Another object of this invention is to provide carrier particles which are long-lived and have enhanced abrasion resistance.

Another object of this invention is to provide carrier particles which are easily prepared.

Other objects and advantages of this invention will become apparent in the following detailed disclosure and description.

SUMMARY OF THE INVENTION

Chemically treated carrier particles in which the chemical treating agent is extended by means of a dry lubricant can be used in developer mixes in order to increase the useful life of the developer and also to provide desired triboelectric properties. Adhering a coating comprise a mixture of a perfluoro carboxylic acid or derivative thereof and a dry lubricant such as molybdenum disulfide to the surface of a carrier particle has been found to result in carriers having a longevity and an abrasion resistance which is significantly greater than untreated carrier particles or carrier particles coated with a perfluorocarboxylic acid itself and triboelectric properties vastly improved over particles coated only with similar molybdenum disulfide and materials. A carrier having low surface energy, a low coefficient of friction and which does not need to be replenished as frequently as other types of carriers is thereby provided. Such carriers are capable of selectively imparting a desired positive triboelectric charge to electroscopic powders with which they are mixed.

DETAILED DESCRIPTION OF THE INVENTION

It has been found that the various problems encountered with previously available carriers are generally obviated by the use of a carrier particle upon the surface of which is coated a mixture of a perfluoro carboxylic acid or derivative thereof and a metallic sulfide which functions as an extender for the perfluoro acid as well as itself providing certain desirable properties.

The perfluoro carboxylic acids contemplated by this invention are those perfluorinated and substantially perfluorinated carboxylic acids, both aliphatic and aromatic, which have carbon chains of from 3 to 18 carbon atoms in length. Exemplary of such acids are perfluoropropionic acid, perfluorobutyric acid, perfluorovaleric acid, perfluoradipic acid, perfluoroheptanoic acid, perfluorooctanoic acid, perfluorononanoic acid, perfluorodecanoic acid, 11 - H -eicosafluoroundecanoic acid, as well as the higher molecular weight aliphatic acids and aromatic acids such as perfluorobenzoic acid. Polycarboxylic acids can also be used, for example, perfluorosuccinic acid or perfluoroglutaric acid. Derivatives of perfluoro carboxylic acids, such as salts, esters and amides can also be used.

The metallic sulfides used as extenders in this invention function as dry lubricants and are primarily responsible for producing a very this film upon the surface of the carrier particles. Exemplary of suitable materials for this purpose are molybdenum disulfide, tungsten disulfide and titanium disulfide.

As carriers it is possible to use a wide variety of substances, for example glass beads, ceramic beads, grains of sand or metallic particles. Non-metallic carriers are useful where a cascade development system is utilized although metallic carriers can also be used in cascade development. Where a magnetic brush developing system is used it is necessary that the carrier be magnetic.

For this purpose various irons and steel have been used, for example, spherical steel beads and irregularly shaped iron powders.

The desired treatment of the carrier can be readily accomplished. It is merely necessary to mix the carrier with a mixture of the perfluoro carboxylic acid and metallic sulfide in which the ratio of metallic sulfide to perfluoro carboxylic acid is in the range of about 0.2:1 to 5:1, preferably about 2:1 to 3:1. The mixture of acid and sulfide can be present in a concentration of from 0.005 to 0.75% based on the weight of the carrier. Mixing can be accomplished in a Waring blender or other conventional mixer in a short time. It is desirable that the carrier being used be thoroughly cleaned and dried prior to treatment with the perfluoro acid and metallic sulfide. In order to adequately mix the metallic sulfide and perfluoro carboxylic acid, it is preferable to have both materials in dry powder form and to dry blend them. The resulting mixture is then readily applied to the carrier particles.

The resulting carriers having a very thin film of the mixture of perfluorocarboxylic acid and metallic sulfide adhered thereto are found to have a longer useful life than prior art carriers in the environment of electrophotographic development. The mixture of perfluoro carboxylic acid and metallic sulfide adheres tenaciously to the carrier material so that the resulting coated carrier is significantly more abrasion resistant than carriers treated with a perfluoro carboxylic acid alone.

Further, as pointed out above, the triboelectric properties of the carriers of this invention are such that most toners will be charged with a positive polarity when used with these carriers. Even toners which normally charge negatively can be charged positively using the carriers of this invention. In addition the charge imparted to the carriers of this invention is of a higher magnitude than that realizable using prior art carriers resulting in the production of copies which are characterized by having low background.

With the outstanding triboelectric properties of the carriers of this invention and the physical properties mentioned above, namely the low coefficient of friction and their enhanced abrasion resistance these carriers represent a significant improvement over carriers which have been previously used. For example whereas a perfluoro carboxylic acid treated carrier may have a useful life of 10–12 hours with a given toner, the carriers of this invention have a useful life of 30–35 hours when used in a high speed electrophotographic copying machine. In addition to the long life of the carriers themselves the particular combination of properties increases the life of the photoconductor used in the electrophotographic process and also results in very high quality copies being produced.

This invention will be better understood by reference to the following examples which are intended to illustrate but not to unnecessarily limit the scope of this invention which is defined in the claims appended hereto.

EXAMPLE 1

A quantity of 100 grams of molybdenum disulfide was placed in an aluminum dish in an oven at 80° C to heat the molybdenum disulfide, and 50 grams of pentadecafluorooctanoic acid (perfluorooctanic acid or PFOA) was placed in an oven at 130° F to melt the PFOA. The heated molybdenum disulfide was blended with the liquid PFOA, cooled and sieved through a -80 mesh sieve. Powdered iron particles, −80, +325 mesh in a quantity of 1200 grams were mixed with 1.8 grams of the blended molybdenum disulfide and PFOA and rolled in a 0.5 gallon can on a ball mill for 2 hours. To the resulting mixture was then added 30 grams of a negative orienting toner containing maleic modified rosin and carbon black and rolling was continued for 45 minutes.

Positive copies having an acceptable background level were made using the developer unit of an Addressograph-Multigraph Model 2300 master maker. The quality of the copies continued to be good up to about 30 hours rack running time without replenishing the mix. Approximately 60 grams of treated carrier and 10 grams of toner were added. Good copies were again developed.

EXAMPLE 2

A quantity of 650 grams PFOA was melted in an oven at 130° F and stirred into a quantity of 1300 grams of heated molybdenum disulfide. The resulting mixture was placed in a high intensity mixer jacketed with circulating cold water and mixed for about 3 minutes to produce a fairly uniform powder. A quantity of 1200 grams powdered iron particles, −80, ±270 mesh were washed in methylene chloride, dried, and mixed with 0.26 gram lithium stearate. The powdered iron mixture and 1.8 grams of the powdered mixture of molybdenum disulfide and PFOA were mixed on a roll mill for 2 hours. To the resulting mixture was then added 30 grams of the toner of Example 1 and mixing was continued for 45 minutes.

The results obtained were similar to those in Example 1. After 30 hours rack running 0.1 gram of the mixture of molybdenum disulfide and PFOA was added to the developer mix with the result that copies made thereafter were clean of background.

EXAMPLE 3

The procedure of Example 1 was followed using 150 grams molybdenum disulfide and 100 grams of the silver salt of heptafluorobutyric acid.

The results was similar to those in Example 1 for up to about 20 hours.

EXAMPLE 4

The procedure of Example 2 was repeated using a toner containing polyamide resin, pentaerythritol ester of polymerized resin, resinated carbon and a positive orienting dye.

Positive copies were made in an Addressograph-Multigraph Model 2300 mastermaker. After a 2 month shelf test, positive copies were obtained while a mixture of toner and powdered iron which did not contain the molybdenum disulfide PFOA mixture evidenced copy reversal.

EXAMPLE 5

The procedure of Example 2 was repeated using a toner containing polyamide resin, maleic modified rosin, polyallyl alcohol, carbon black and a positive orienting dye.

The results obtained were similar to those of example 1. Aging of the developer mix in an oven at 107° F for 16.5 hours did not affect the quality of the copies obtained. The developer mix was placed in an environmental chamber at 80° F and 10% R.H. for 65 hours with comparable results.

EXAMPLE 6

The procedure of Example 1 was followed using a toner containing polyamide resin, pure phenolic resin and resinated carbon.

The results obtained were similar to those of Example 1 with clean copies being obtained. Using an Addressograph-Multigraph Model 1250 duplicator satisfactory copies were obtained from both a pressure fused master and a heat fixed master.

EXAMPLE 7

The procedure of Example 2 was followed using a toner containing terpene phenol resin, polyvinylbutyral, hydrogenated tallow glyceride and resinated carbon.

Excellent copies were obtained after 22.5 hours continuous rank running.

EXAMPLE 8

The procedure of Example 2 was followed using a toner containing terpene phenol resin, polyamide resin and a negative orienting dye.

The results were similar to those of Example 1 with good positive copies being obtained up to about 70 hours. A developer mix which contained no molybdenum disulfide-PFOA mixture resulted in the production of strong reversal copies.

We claim:

1. A carrier for use in electrophotographic development of latent electrostatic images capable of inducing an electrostatic charge in a toner mixed therewith with comprises a member selected from the group consisting of metallic particles and siliceous particles to the surface of which is adhered a mixture of a metallic sulfide selected from the group consisting of molybdenum disulfide, tungsten disulfide and titanium disulfide and a member selected from the group consisting of perfluorinated and substantially perfluorinated carboxylic acids containing from 3 to 18 carbon atoms and salts, esters and amides thereof, said sulfide and acid being present in a ratio by weight of sulfide to acid of about 0.2:1 to 5:1.

2. A carrier according to claim 1 wherein said mixture of sulfide and acid is present in a concentration of about from 0.005 to 0.75% based on the weight of said particles.

3. A carrier according to claim 1 wherein said sulfide and acid are present in a ratio of about 2:1 to 3:1.

4. A carrier according to claim 1 wherein said acid is perfluoro octanoic acid.

5. A carrier according to claim 1 wherein said electrostatic charge is of positive polarity.

6. A carrier according to claim 1 said particles are non-magnetic.

7. A carrier according to claim wherein said particles are magnetic.

8. A carrier according to claim 1 wherein said particles are iron.

* * * * *

UNITED STATES PATENT AND TRADEMARK OFFICE

CERTIFICATE OF CORRECTION

PATENT NO. : 4,073,980

DATED : February 14, 1978

INVENTOR(S) : Virgil W. Westdale and John Novotny

It is certified that error appears in the above-identified patent and that said Letters Patent are hereby corrected as shown below:

Column 2, line 16, "comprise" should be deleted and "comprising" substituted therefor.

Column 4, line 25, "±" should be deleted and "+" substituted therefor.

Column 6, line 3, "with" should be deleted and "which" substituted therefor.

Signed and Sealed this

*Fifteenth* Day of *August 1978*

[SEAL]

*Attest:*

RUTH C. MASON
*Attesting Officer*

DONALD W. BANNER
*Commissioner of Patents and Trademarks*